United States Patent
Pan et al.

(10) Patent No.: US 9,008,846 B2
(45) Date of Patent: Apr. 14, 2015

(54) LOCK-SETTING THERMOSTAT WITH FLASH-MEMORY KEY

(75) Inventors: Weidong Pan, Morganville, NJ (US); Michael P. Muench, Canastota, NY (US); Kevin P. Jobsky, Camillus, NY (US)

(73) Assignee: International Controls and Measurements Corporation, North Syracuse, NY (US)

( * ) Notice: Subject to any disclaimer, the term of this patent is extended or adjusted under 35 U.S.C. 154(b) by 384 days.

(21) Appl. No.: 13/557,556

(22) Filed: Jul. 25, 2012

(65) Prior Publication Data

US 2014/0031994 A1 Jan. 30, 2014

(51) Int. Cl.
  *G05B 19/00* (2006.01)
  *G05D 23/19* (2006.01)
  *F24F 11/00* (2006.01)

(52) U.S. Cl.
  CPC ..... *G05D 23/1902* (2013.01); *F24F 2011/0091* (2013.01)

(58) Field of Classification Search
  USPC .............................. 700/278; 340/541; 174/562
  See application file for complete search history.

(56) References Cited

U.S. PATENT DOCUMENTS

| | | | |
|---|---|---|---|
| 5,682,949 A * | 11/1997 | Ratcliffe et al. | 165/209 |
| 5,805,443 A | 9/1998 | Raffray et al. | |
| 6,622,115 B1 | 9/2003 | Brown et al. | |
| 6,644,557 B1 * | 11/2003 | Jacobs | 236/46 R |
| 7,003,378 B2 | 2/2006 | Poth | |
| 7,569,777 B1 * | 8/2009 | Gillam | 174/562 |
| 8,145,357 B2 | 3/2012 | Nibler et al. | |
| 2004/0193548 A1 * | 9/2004 | Poth | 705/63 |
| 2007/0210177 A1 * | 9/2007 | Karasek | 236/46 R |
| 2009/0143879 A1 * | 6/2009 | Amundson et al. | 700/83 |
| 2009/0164049 A1 * | 6/2009 | Nibler et al. | 700/276 |
| 2011/0181412 A1 * | 7/2011 | Alexander et al. | 340/541 |

* cited by examiner

*Primary Examiner* — Robert Fennema
*Assistant Examiner* — Anthony Whittington
(74) *Attorney, Agent, or Firm* — Bernhard P. Molldrem, Jr.

(57) ABSTRACT

Property-management or lock-setting thermostats have maximum and minimum set points locked in to prevent abuse of management-provided heating and/or air conditioning. An ePROM or similar internal memory device stores heating and cooling limit parameters that are set in by a technician at the time of installation. A plug-in flash memory module contains an unlock code to match the unlock code stored in said ePROM, to unlock the thermostat and allow the settings to be adjusted; when said flash memory module is removed the thermostat reverts to its lock condition. The thermostat can also respond to unusual rates of change of temperature to block furnace or A/C operation temporarily.

8 Claims, 2 Drawing Sheets

LOCK-SETTING THERMOSTAT WITH FLASH-MEMORY KEY

BACKGROUND OF THE INVENTION

The present invention relates to commercial and/or residential heating and/or cooling systems and other indoor comfort systems, and is more particularly concerned with thermostats that are employed in managed properties, i.e., buildings and other properties in which individual spaces are occupied by tenants, i.e., families or companies. The invention is more specifically directed to property-management thermostat systems, i.e., landlord thermostats or lock-setting thermostats that are intended to prevent abuse of heating and/or air conditioning service that is provided to tenants. The heat or cooling may be provided from individual furnaces, heat pumps and air conditioners, from central heating and/or chilling facilities, or from thermal comfort units that are common to groups of tenant spaces within the managed property.

Wall thermostats are typically installed on an interior wall of a dwelling or commercial space to control the operation of a furnace, air conditioner, heat pump, or other environmental control equipment. The thermostat is intended to monitor the temperature of the room or other interior comfort space continuously, and to adjust the operation of the associated environmental control equipment to keep an interior comfort space parameter (e.g., temperature) within some range (e.g., 20° C.±0.5° C. or 68° F., ±1.0° F.). Other controls may be sensitive to other parameters, such as humidity or particulate level. The thermostat is typically connected to the furnace, air conditioner, heat pump or the like by means of a run of thermostat wires.

In commercial rental space or in residential rental properties such as apartments or condominiums, the landlord or property management company typically furnishes the heat and air conditioning, either through central furnace or boiler system for the heat and central chiller unit for air conditioning, or in some case using individual or localized furnaces and air conditioning units. In either case effective property management requires that the tenants not abuse the heating and cooling that is furnished so that costs and other problems may be kept under control.

In a typical existing property management thermostat system, which is discussed later in respect to FIG. 1 of the drawing, each tenant unit is provided with a thermostat to be mounted on the wall of the tenant space and is operatively coupled to the associated furnace, heat pump, and/or air conditioning unit. A building management technician installs the thermostat, and at the time of installation sets limits to the degree of heating or cooling that is permitted for the tenant. The typical such property management thermostat is configured as a lock-setting thermostat. The thermostat has an internal control circuit within the thermostat housing, and that is connected to a temperature sensor and to a signaling arrangement that connects thermostat power to the appropriate thermostat wires when there is a call for heat or a call for cooling. In addition, the lock-setting thermostat has an internal memory device, i.e., ePROM, that stores heating and cooling limit parameters that are set into the thermostat by the technician at the time of installation. That is, at installation, the technician may select a maximum heating set point, e.g., 68 degrees F., and a minimum air conditioning cooling setpoint, e.g., 74 degrees F. These are intended to place a limit to the thermostat settings that the tenant can select, so that in winter the tenant cannot set the heat setpoint above 68 degrees and in summer the tenant cannot set the cooling setpoint below 74 degrees. In the state-of-art systems, once the technician has entered the settings, these are permanently stored in the ePROM, and cannot later be changed, except by entirely replacing the thermostat. A disadvantage is that the current lock-setting thermostats cannot be re-programmed with new limits to accommodate a new tenant or to accommodate any tenant's change in circumstances, or to accommodate changes in local building codes.

Another problem encountered in managed property units is the tendency of some of the tenants to attempt to defeat the lock settings of the thermostat. This most often involves providing heat to the thermostat so that the local heat in the vicinity of the thermostat is much higher than the general room heat. For example, the tenant may place a lamp with an incandescent light bulb directly beneath the thermostat to heat it well above the established set point, so that the air conditioning will continue to furnish chilled air even when the air temperature is below the established cooling set point. Likewise, a tenant may hang a bag of ice on the thermostat to cool it well below the winter heating set-point so that the furnace or heater will continue to furnish heat even when the room air in the tenant space is warmer than the heat set-point. Current lock-setting thermostats lack any means of detecting any such attempt to defeat the thermostat, and cannot stop wasteful overheating or overcooling in these circumstances.

OBJECTS AND SUMMARY OF THE INVENTION

Accordingly, it is an object of the present invention to provide an improvement to a property-management thermostat that overcomes the above-mentioned drawback(s) of the prior art.

It is another object to provide an effective means for the property management technician to unlock the thermostat settings when necessary to re-program the thermostat with new or changed settings.

It is a more specific object to provide a thermostat which accepts a digital key device, e.g., a flash memory card device, which permits the technician to lock and unlock the thermostat.

It is yet another object to provide the thermostat with means to recognize an unusual or abnormal heating condition, and to interrupt a heating or cooling cycle so as to avoid an attempt by a tenant or other person in the tenant space to defeat the lock-setting thermostat.

In accordance with one aspect of the present invention, a thermostat adapted to be mounted on a wall within a tenant comfort zone within a managed property, and is adapted to communicate with a climate control unit (furnace or air conditioner, for example) for that tenant comfort zone. The thermostat thus adjusts the temperature of air within the tenant comfort zone. The wall thermostat comprising a housing, a controller circuit within the housing wherein the controller circuit contains a temperature control program in which one or more temperature setpoints are established. Favorably, these are setpoint limits, as discussed earlier. An air temperature sensor within the thermostat is coupled to the controller circuit. The controller circuit is operatively coupled to a signaling unit, i.e., a connector block to which the thermostat wires are attached, to provide a call for heating or cooling to the associated climate control unit when the air temperature in the tenant comfort zone is beyond an associated one of said temperature setpoints, that is, above a cooling set point or below a heating set point. One or more operator controls, i.e., pushbuttons, on the thermostat housing are coupled to the controller circuit to permit at least limited adjustment of the one or more setpoints in the temperature control program. In some cases, these may be virtual pushbuttons on an active touch-screen. The controller circuit is configured to be set into a lock condition in which at least certain parameters within the temperature control program are disabled from adjustment, and an unlock condition in which those parameters are enabled for adjustment. An ePROM within the housing is operatively coupled to the controller circuit and contains an unlock code specific to that particular tenant comfort space. A receptacle is provided on or in the thermostat housing, with the receptacle being operatively coupled to the ePROM, and adapted to receive a plug-in flash memory module that contains an unlock code that matches the unlock code stored in the ePROM. Favorably, the flash memory module may be an SD card, but other suitable devices are available. When the flash memory module is in place in the receptacle, the controller circuit is set into its unlock condition to allow the settings of the thermostat temperature control program to be adjusted, and when said flash memory module is removed, the controller circuit resets into its lock condition.

The flash memory module may optionally contain a new temperature control program to be transferred to the wall thermostat for that tenant comfort space. In that case the controller circuit automatically downloads the new temperature control program from the flash memory module when the plug-in flash memory module is inserted into the receptacle in the thermostat.

In order to detect an abnormal heating or cooling event, e.g., an attempt by the someone in the tenant space to defeat the thermostat, the controller circuit of said wall thermostat is operative to sense a time rate of change of temperature (dT/dt) of the air in the tenant comfort space. The thermostat will automatically lock out from making a call for heat or call for cooling if the thermostat detects that the time rate of change of temperature exceeds some predetermined threshold. This may be for example a temperature change of more than ten degrees in a one-minute period. In a favorable embodiment, if the thermostat detects that the time rate of change of temperature in the air in the tenant comfort space exceeds the threshold, the controller circuit locks out the thermostat for a period of time, e.g., ten minutes, and thereafter resets to permit a call for heat or cooling.

The ePROM in the thermostat may be configured to store and maintain an electronic history of heating and/or cooling operations. The controller circuit can then be operative to download the electronic history from the ePROM to said flash memory module when said flash memory module is inserted into the receptacle in said wall thermostat. Then when the technician returns to the office, he or she can transfer the heating and cooling histories for the various tenants into the property management computer system, where the information may be used to improve the heating and/or cooling programs.

DETAILED DESCRIPTION OF THE PREFERRED EMBODIMENT

Figure 1:
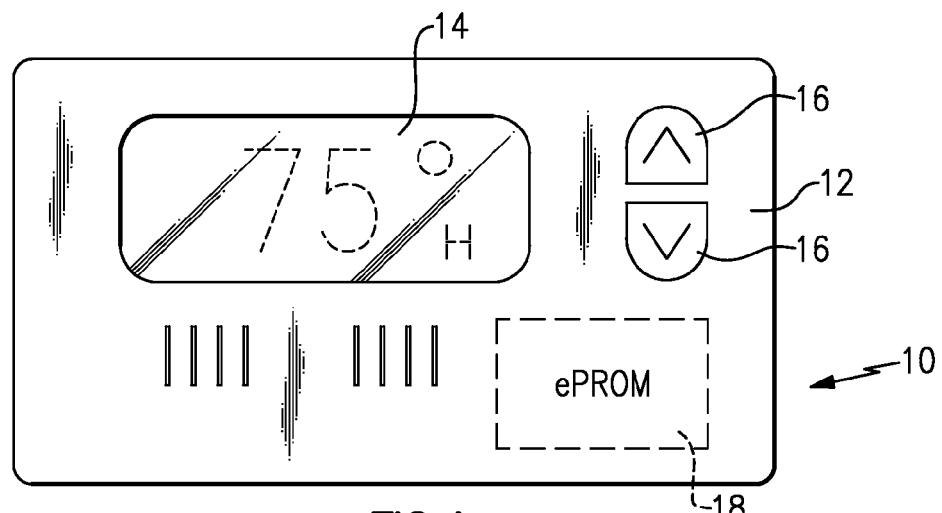
FIG. 1 is a front view of a lock-setting thermostat of the prior art.

With reference now to the Drawing, FIG. 1 shows a lock-setting or landlord thermostat 10 of the type currently in use in by property management organizations for managed properties such as office buildings, apartment houses, condominiums, and resort complexes, in which heating and/or cooling are furnished to the individual tenant spaces. The prior art thermostat 10, as shown here, has a housing or case 12 with a display 14 for showing temperature, temperature set-points, and thermostat settings. There are also manual controls, here in the form of up-down push buttons 16, 16, for adjusting temperature setpoints, for example. In some versions there can be more than the two push buttons, or the controls can be virtual, i.e, where the display 14 is in the form of a touch screen. In this property management thermostat 10, a non-volatile memory device, e.g., and ePROM 18 stores thermostat settings, including for example a maximum set-point limit for heating and a minimum set-point limit for air conditioning. These may be entered by the technician or installer at the time the thermostat is installed. Once the settings are entered by the technician, at least some of them are locked in and cannot be changed. Typically, these would be maximum and minimum set point limits. The concept is to provide the tenant with some latitude in the heating and/or cooling of the tenant space, but to limit the temperature to maximums and minimums, to defeat wasteful behavior by a tenant, namely, calling for excessive heating or cooling. In the prior art arrangement of FIG. 1, the locked-in parameters cannot be reset. The only way to change the locked settings is to replace the thermostat 10 with a new thermostat. Due to tenant special needs, for example, where building management is required to adjust the maximum or minimum temperature limits for a given tenant, it would be desirable to have lock-setting thermostats of this general type, which lock in at least some of the settings, but can somehow be unlocked so that the settings can be changed, and then re-locked to preclude unauthorized adjustment of temperature limits.

Figure 2:
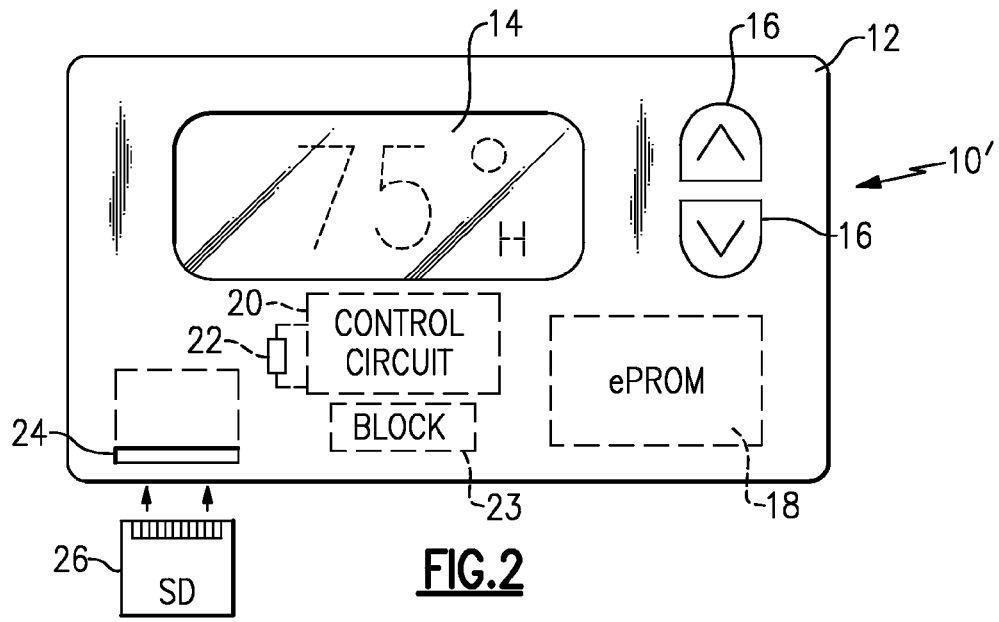
FIG. 2 is a front view of a lock-setting thermostat according to one preferred embodiment of this invention.

A lock-setting thermostat 10' according to an embodiment of this invention is shown in FIG. 2. Here, the elements that are in common with the prior-art thermostat of FIG. 1 are identified with the same reference numbers. However, this thermostat 10' is arranged so that the thermostat can be unlocked for adjustment by the authorized building management technician, and can then be re-locked. The thermostat also includes a general control circuit 20 situated within the housing, with which a room-air temperature sensor 22 is associated. This control circuit 20 includes the internal elements that compare the sensed room space temperature with the established set-points, and initiate a call for heating or cooling, and then transmit a signal via thermostat wiring to the associated climate control unit (e.g., furnace or air conditioner) if the set-point is reached or exceeded. The ePROM 18, as discussed above in reference to FIG. 1, contains the heating/cooling program, including set-back times and temperatures, either daily or on a day-of-week basis, or other parameters that can be monitored by thermometers of this type. The control circuit 20 also connects with a wiring block 23 within the housing 12, that sends a call for heat or a call for cooling over thermostat wires (not shown).

In this embodiment, the thermostat housing 12 has an SD card slot or receptacle 24 that is adapted or configured to receive an SD card 26, and connect it with the control circuit 20 and the associated ePROM 18. The SD card 26 is a flash memory module in the form of a small square or slightly oblong flat card with connector electrodes along one side that mate with corresponding connectors within the SD card slot or receptacle 24. The SD card contains a code or sequence that is compared with a corresponding code or sequence stored at a predetermined memory location on the ePROM 18 to unlock the device and permit the technician switch the thermostat 10' between its locked and unlocked conditions. Thus inserting the card 26 into the thermostat allows the technician to unlock the thermostat, and removing the card 26 afterwards returns the thermostat to its locked condition. The unlocking can take place automatically as a response to insertion of the SD card 26, with re-locking coming upon removal of the card. Alternatively, insertion of the SD card can provide an a predetermined amount of unlock time or unlock period, e.g., 15 minutes, such that after unlocking the thermostat the technician can remove the card, then re-set the thermostat program values, and after the expiration of the unlock period the thermostat will automatically return to the locked condition. In one preferred mode, the card 26 can contain numerous unlock codes in predetermined memory locations on the card, each corresponding to a different one of the tenant thermostats within the managed property. This allows the technician to use a single SD card 26 to lock and unlock a number of different tenant thermostats. Most preferably, the thermostats would each have a different, randomly generated, lock/unlock code. Another feature that may be present is that once the SD card 26 is inserted into the thermostat 10' for a given tenant space, and the code on the SD card 26 matches the unlock code on the associated ePROM 18, the algorithm stored in the ePROM can generate a new random code sequence to be stored on both the ePROM 18 and the SD card 26, as a new lock/unlock code. Moreover, the data stored on the SD card 26 can include a new temperature control program, which can be downloaded electronically to the thermostat 10' once the card 26 is inserted into the associated slot 24, and the thermostat goes into its unlock mode. As still another possible feature, the ePROM 18, or another memory location within the control circuit 20 for each thermostat can maintain an operation history for the given tenant unit thermostat, that is, a history of temperature set-point settings, and a record of calls for heating and cooling, as well as a history of temperatures over a time period within the tenant space as measured by the temperature sensor 22. When the card 26 is inserted into the card slot 24 of the thermostat and sets the thermostat 10' into its unlock mode, the tenant's thermostat operation history may be automatically downloaded onto a memory location within the flash memory of the card 26. Then the technician can transfer this information into the management data system for analysis and for property management purposes.

Figure 3:
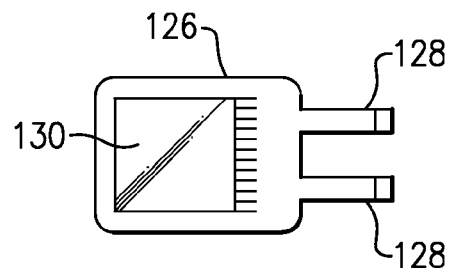
FIG. 3 shows an alternative flash memory key device for some embodiments of the invention.

An alternative flash memory device that can be used in place of the SD card 26 is shown in FIG. 3. It may be preferred in some cases to have the flash memory unit in a different, proprietary arrangement to fit into a corresponding connector in the thermostat(s) of the managed property. Here, an illustrative example has a body 126 from which there are a number of protruding connectors 128, and with a flash memory module 130 contained within the body 126. A corresponding receptacle (not shown) would be present either on the housing or within the housing 12 (if it is preferred to require removal of the thermostat cover).

An explanation of the operation of the lock and unlock procedures is as follows, with reference to FIGS. 4, 5, 6, and 7.

Figure 4:
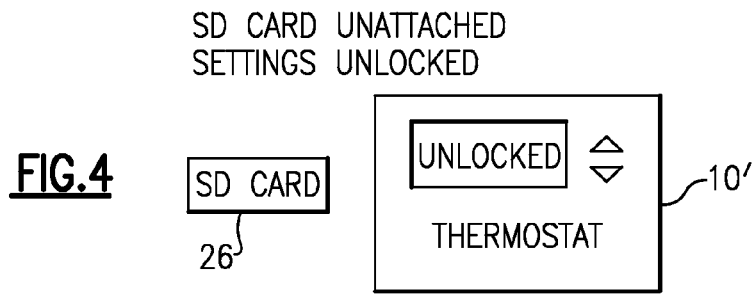
FIGS. 4, 5, 6, and 7, are schematic views for explaining the locking, setting and unlocking of the thermostats of this invention.
Figure 5:
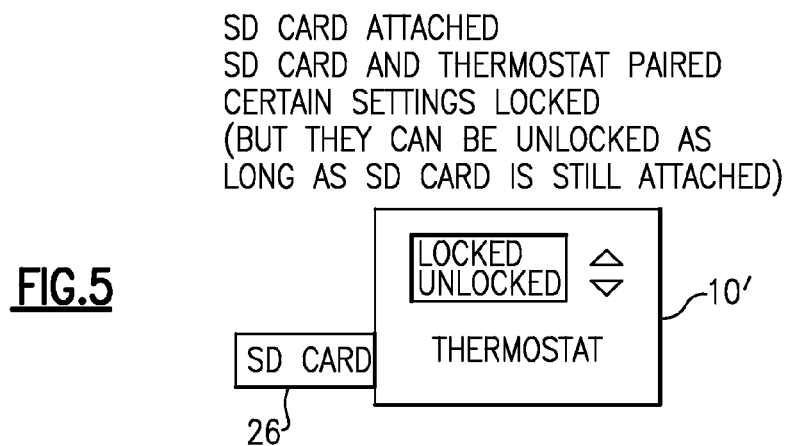
Figure 6:
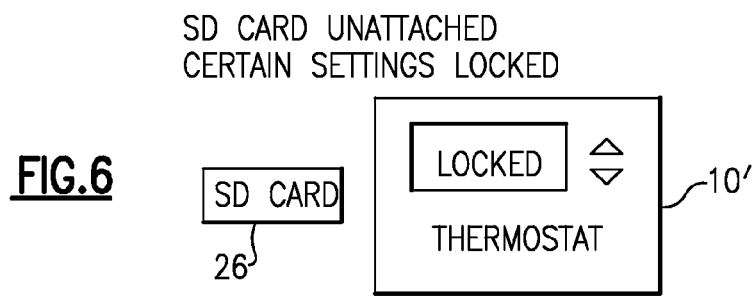

In FIG. 4, the thermostat 10' is shown as freshly installed, with the SD card 26 not yet having been inserted or connected to it. The thermostat 10' is initially in its unlock mode, so the technician can enter the program information, including temperature set-point limits, as discussed above. As shown in FIG. 5, the SD card 26 is inserted and the thermostat ePROM and SD card are paired. This creates a random number lock unlock code that is stored in corresponding memory locations on both the SD card 26 and the ePROM 18. Certain thermostat settings are locked, although they can still be unlocked as long as the SD card 26 is still in place in the thermostat. Then, the SD card 26 is removed or unattached, as shown in FIG. 6, and those certain thermostat settings are locked in and cannot be changed by the tenant. The technician takes the card 26 with him.

Figure 7:
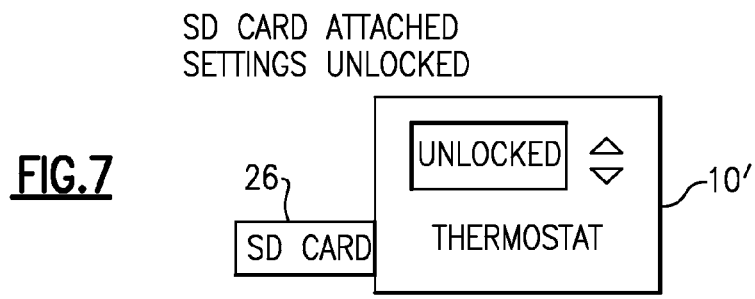

Later, as shown in FIG. 7, the same SD card 26 can be re-inserted into the thermostat 10' to unlock the thermostat settings so they can be adjusted. At this time, the thermostat ePROM and SD card may create and store a new lock-unlock code, as discussed above. The thermostat then returns to the lock mode.

With this arrangement, the technician can download information from the SD card 26, and the technician can then create a back-up key in the form of a duplicate SD card. Favorably, the system can create a special "master key" code to unlock thermostats if the SD card is unavailable or is damaged. Then for each thermostat on which the master key is used, the thermostat operation history, as discussed above, would reveal the use of a "master key" to open the thermostat settings.

Another feature that may be preferred is sensitivity to a rapid temperature change, either upward or downward, that may be characteristic of an attempt of a tenant to defeat the temperature limiting of the thermostat. That is, by incorporating a feature that detects the time rate of change of temperature of the air in the tenant space, it is possible to identify a possible improper tenant action, such as placing a source of heat (e.g., an incandescent lamp) near the thermostat or a source of cold (e.g. a bag of ice) on the thermostat. In either case, the rate of change of temperature over time is monitored. If the time rate of change of temperature exceeds some threshold that would be far above normal heating or cooling, e.g. more than ten degrees F. per minute, then the thermostat can automatically shut down the heating or cooling cycle for some period of time (e.g., ten minutes) and lock out and not send any call for heating or cooling until that time has expired. Thereafter, the thermostat will revert to its normal mode. However if the source of abnormal heating or cold is still present, the thermostat will detect that and again go into a lockout mode for at least a preset period of time. The purpose of this feature is to prevent the tenant from defeating or "fooling" the thermostat, and from wastefully abusing the use of energy for needless over-heating or over-cooling the tenant space.

The property-management thermostats embodying this invention can be used with any controlled environmental comfort control equipment, including not only furnaces, heaters, air conditioning units and heat pumps, but may also be configured to use with fan-coil comfort units, of either two- or four-pipe construction, or many other possible types of equipment.

The term "flash memory device" as used here includes not only the SD card of the preferred embodiment but also any equivalent device, not limited to RS-MMC, miniSD, microSC, or USB flash memory devices of various types.

While the invention has been described with reference to specific preferred embodiments, the invention is certainly not limited to the precise embodiments as illustrated here. Rather, many modifications and variations will become apparent to persons of skill in the art without departure from the scope and spirit of this invention, as defined in the appended claims.

We claim:

1. Wall thermostat configured to be mounted in a tenant comfort zone within a managed property, and configured to communicate with a climate control unit for said tenant comfort zone to adjust the temperature of air within said tenant comfort zone; the wall thermostat comprising a housing, a controller circuit within said housing and containing a temperature control program in which one or more temperature set-points are established; an air temperature sensor coupled to the controller circuit; the controller circuit being operatively coupled to a signaling unit to provide a call for heating or cooling to said climate control unit when the air temperature in said tenant comfort zone is beyond an associated one of said temperature set-points; one or more operator controls located on the thermostat housing and coupled to said controller circuit to permit at least limited adjustment of the one or more set-points in the temperature control program within one or more set-point limits; said controller circuit being configured to be set into a lock condition in which at least certain parameters including said one or more set-point limits within the temperature control program are disabled from adjustment, and an unlock condition in which said parameters are enabled for adjustment; an ePROM within said housing and operatively coupled to said controller circuit and containing an unlock code specific to said tenant comfort space; and a receptacle in said housing, operatively coupled to said ePROM, and adapted to receive a plug-in flash memory module that contains an unlock code that matches the unlock code stored in said ePROM; such that when said flash memory module is in place in said receptacle, the controller is set into its unlock condition to allow the operator controls on the thermostat housing to adjust said parameters of the thermostat temperature control program, and when said flash memory module is removed therefrom, the controller circuit returns to its lock condition wherein the operator controls are disabled from adjusting said parameters.

2. Wall thermostat according to claim 1, wherein the controller circuit of said wall thermostat is operative to sense a time rate of change of temperature dT/dt of the air in the tenant comfort space, and to lock out the thermostat from making a call for heat or call for cooling if the thermostat detects that during a call for heat or cooling the time rate of change of temperature goes beyond a predetermined threshold.

3. Wall thermostat according to claim 2, wherein when the thermostat detects that the time rate of change of temperature in the air in the tenant comfort space goes beyond said threshold, the controller circuit locks out the thermostat for a predetermined period of time, and thereafter resets to permit a call for heat or cooling.

4. A property-management heating and/or cooling control arrangement for a managed property that is composed of a plurality of individual tenant comfort spaces, the arrangement comprising a plurality of respective wall thermostats each configured to be mounted within a respective tenant comfort zone within said managed property, and configured to communicate with a climate control unit for said tenant comfort zone to adjust the temperature of air within said tenant comfort zone; each said wall thermostat comprising a housing, a controller circuit within said housing and containing a temperature control program in which one or more temperature set-points are established; an air temperature sensor coupled to the controller circuit; the controller circuit being operatively coupled to a signaling unit to provide a call for heating or cooling to said climate control unit when the air temperature in said tenant comfort zone is beyond an associated one of said temperature set-points; one or more operator controls located on the thermostat housing and coupled to said controller circuit to permit at least limited adjustment not going beyond a set-point limit of the one or more set-points in the temperature control program; said controller circuit being configured to be set into a lock condition in which at least certain parameters, including said set-point limit within the temperature control program are disabled from adjustment, and an unlock condition in which said parameters including at least said set-point limit are enabled for adjustment; an ePROM within said housing and operatively coupled to said controller circuit and containing an unlock code specific to said tenant comfort space, and independent of unlock codes for other tenant spaces; and a receptacle in said housing, operatively coupled to said ePROM, the receptacle being configured to receive a plug-in flash memory module that contains an unlock code that matches the unlock code stored in said ePROM; such that when said flash memory module is in place in said receptacle, the controller is set into its unlock condition and the operator controls located on said thermostat housing are enabled to adjust said parameters of the thermostat temperature control program, and when said flash memory module is removed therefrom, the controller circuit is set into its lock condition wherein said operator controls are disabled from adjusting said parameters; and a property-management flash memory module including a connector to fit said receptacles and containing in respective locations therein unlock codes for each of the respective wall thermostats for said tenant comfort spaces, to permit an authorized property-management technician to unlock each of the thermostats, as needed, to adjust the temperature control program thereof.

5. The property-management heating and cooling arrangement of claim 4, wherein each of the thermostats for the respective tenant comfort spaces has an associated unlock code generated randomly independent of the unlock codes of the other said thermostats, and upon insertion and removal of the flash memory module into the receptacle of any of said thermostat, the thermostat control circuit thereof is operative to generate a new random unlock code therefor and store it in the associated ePROM and in an associated memory location on said flash memory module.

6. The property-management heating and cooling arrangement of claim 4, wherein when said flash memory module is inserted into the receptacle of one of said thermostats, the thermostat control circuit is set into its unlock condition for a predetermined period of time, and then automatically returns to its lock condition.

7. The property-management heating and cooling arrangement of claim 6, wherein said predetermined period of time is in the range of five to fifteen minutes.

8. Wall thermostat according to claim 1 said controller circuit being configured to generate a random unlock code upon insertion of the flash memory module into the receptacle said thermostat, and the thermostat controller circuit being operative to generate a new random unlock code therefor and store it in the associated ePROM and in a memory location on said flash memory module.

* * * * *